United States Patent
Nowak et al.

(10) Patent No.: US 9,859,725 B2
(45) Date of Patent: Jan. 2, 2018

(54) CHARGING DEVICE WITH AUTO-ON CIRCUIT AND SYSTEM

(71) Applicant: GOOGLE TECHNOLOGY HOLDINGS LLC., Mountain View, CA (US)

(72) Inventors: Daniel Nowak, Chicago, IL (US); Roshan Kamath, Hainesville, IL (US); Daniel H Wagner, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 270 days.

(21) Appl. No.: 14/098,909

(22) Filed: Dec. 6, 2013

(65) Prior Publication Data

US 2015/0123620 A1    May 7, 2015

Related U.S. Application Data

(60) Provisional application No. 61/899,797, filed on Nov. 4, 2013.

(51) Int. Cl.
*H02J 7/00* (2006.01)

(52) U.S. Cl.
CPC .......... *H02J 7/0036* (2013.01); *H02J 7/0047* (2013.01); *H02J 7/0054* (2013.01); *Y10T 307/74* (2015.04)

(58) Field of Classification Search
CPC .............................................. H02J 2007/0095
See application file for complete search history.

(56) References Cited

U.S. PATENT DOCUMENTS

| | | | | |
|---|---|---|---|---|
| 4,538,074 A * | 8/1985 | Fraden | ............... | H03K 17/28 307/126 |
| 5,498,949 A | 3/1996 | Dowe | | |
| 7,719,866 B2 * | 5/2010 | Boldo | .................. | G05F 1/67 323/282 |
| 7,928,606 B2 * | 4/2011 | Chung | .................. | G06F 1/3203 307/113 |
| 8,237,414 B1 * | 8/2012 | Li | .................... | H02J 7/0003 320/103 |

(Continued)

FOREIGN PATENT DOCUMENTS

EP    1588347 B1    4/2009

OTHER PUBLICATIONS

Micrel publication MIC7211/7221 IttyBitty® Rail-to-Rail Input Comparator pp. 1-8.*

(Continued)

*Primary Examiner* — Drew A Dunn
*Assistant Examiner* — Tynese McDaniel
(74) *Attorney, Agent, or Firm* — Brake Hughes Bellermann LLP

(57) ABSTRACT

An electronic device having an auto-on circuit is provided. The electronic device can include a charging circuit and a control circuit. The control circuit can cause the charging circuit to deliver energy to an external device. The auto-on circuit, which can include an active circuit, can activate the control circuit in response to one or more trigger input circuits. Each trigger input circuit can actuate a switch and deliver an auto-on signal to the control circuit. The control circuit can then actuate a latch to deliver power to a power input terminal to keep itself powered ON.

15 Claims, 9 Drawing Sheets

(56) References Cited

U.S. PATENT DOCUMENTS

| | | | |
|---|---|---|---|
| 2008/0178275 A1* | 7/2008 | Chung | G06F 21/83 726/9 |
| 2009/0110206 A1* | 4/2009 | Haggis | H04W 52/0225 381/58 |
| 2011/0241627 A1* | 10/2011 | Arai | H02J 7/0031 320/162 |
| 2011/0279163 A1* | 11/2011 | Barnett | G01R 15/16 327/324 |
| 2011/0304299 A1* | 12/2011 | Yang | H02J 7/045 320/107 |
| 2013/0026977 A1 | 1/2013 | Pei et al. | |
| 2013/0076298 A1* | 3/2013 | Miller | H02J 7/0027 320/103 |
| 2013/0093381 A1* | 4/2013 | McGinley | H02J 7/0068 320/107 |
| 2014/0140048 A1* | 5/2014 | Miller | H02J 7/0027 362/183 |
| 2014/0312691 A1* | 10/2014 | Doljack | H02J 7/0036 307/29 |
| 2015/0123594 A1 | 5/2015 | Nowak et al. | |

OTHER PUBLICATIONS

Non-Final Office Action from U.S. Appl. No. 14/098,898, dated Oct. 22, 2015, 25 pages.

* cited by examiner

CHARGING DEVICE WITH AUTO-ON CIRCUIT AND SYSTEM

CROSS-REFERENCE TO RELATED APPLICATION(S)

The present application claims priority to U.S. Provisional Patent Application No. 61/899,797, filed Nov. 4, 2013, which is hereby incorporated by reference herein in its entirety, and which is assigned to the same assignee as the present application.

BACKGROUND

Technical Field

This disclosure relates generally to devices, and more particularly to electronic devices operable with other electronic devices.

Background Art

Portable electronic devices, such as mobile telephones, laptop computers, tablet computers, pagers, and two-way radios, for example, derive their portability from batteries. A typical battery disposed within one of these devices includes one or more electrochemical cells that may be charged and discharged to power the device. The use of rechargeable batteries allows mobile devices to slip the surly bonds of wall-tethered power connections to travel with users wherever they may go. When the battery becomes depleted, the user must couple the device to a charger to charge the battery. Once charged, the user can then detach the device from the charger to portably use the device until the battery is depleted.

Traditional chargers are generally powered from wall outlet via a power cord. Since these chargers have a relatively unlimited supply of power, they can be left ON all the time. Thus, to charge a device, the user simply attaches the device and walks away. However, some manufacturers have begun to develop portable chargers that a user can carry to charge devices that unexpectedly deplete their batteries. As these portable chargers rely on portable sources of energy, they frequently include a power button with which the user can turn the device ON for charging purposes. One frustrating experience that can occur with some chargers is forgetting to turn them ON after connecting the electronic device to be charged. A user who forgets to turn the charger ON may walk away for some period of time and then return, expecting a fully charged device, only to find that their device has not charged at all. It would be advantageous to have a device, system, or method capable of remedying such situations.

Figure 1:
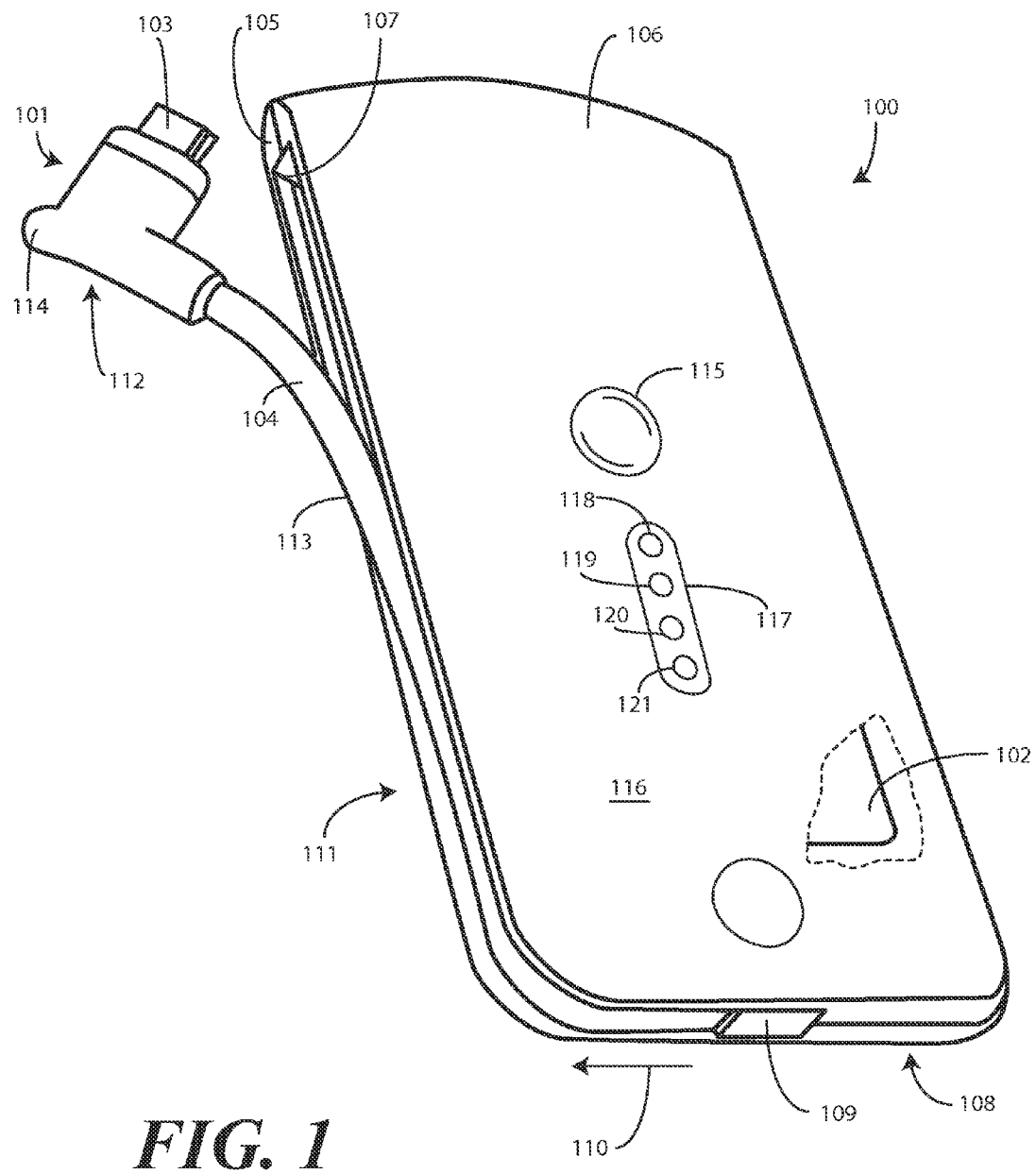
FIG. 1 illustrates one explanatory device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing an auto-on circuit and/or automatically actuating a control circuit of a device when another device is attached thereto. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of automatically turning ON a control circuit of a first device when another device is attached as described herein. The non-processor circuits may include, but are not limited to, a radio receiver, a radio transmitter, signal drivers, clock circuits, power source circuits, and user input devices. As such, these functions may be interpreted as steps of a method to perform automatically actuating a control circuit in a first device when another device is attached. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a circuit, system, device, and method that enable a control circuit, and thus an electronic device, to automatically turn ON when another device is attached to a connector. Accordingly, when a user connects a device configured in accordance with one or more embodiments of the disclosure to another device, the first device automatically turns ON without the necessity of pressing a button or other control device to turn it ON. Embodiments of the disclosure are particularly well suited to portable charging devices because the portable charging device can be left OFF to save power when not in use. However, when a user connects the portable charging device to another device, embodiments of the disclosure provide mechanisms, circuits, and methods to automatically turn the portable charging device ON without the user needing to press a button. Thus, charging is simply initiated by connecting the devices together. While a portable charging device will be used to illustrate operation of one or more embodiments of the disclosure, those of ordinary skill in the art having the benefit of this disclosure will recognize that the auto-on circuits and methods described herein will work with other devices as well.

In one embodiment, an electronic device includes one or more connectors to connect to an external device. Charging circuitry is operable with one or more energy storage devices, such as a rechargeable battery, fuel cell, or super capacitor, to deliver energy to the external device(s) through the connector(s). Accordingly, the charging circuitry and energy storage devices can be used to provide power to the external device(s), for normal ON-state use and/or the charging of their own rechargeable batteries, in one application.

In one embodiment, a control circuit is operable with the charging circuit to actuate the charging circuitry when an external device is connected to the connector. An auto-on circuit is operable to actuate the control circuit when the external device is connected. In one embodiment, the auto-on circuit includes a switch, one or more trigger input circuits for the switch, and a logical latch element. Where multiple trigger input circuits are used to control the switch, they can be arranged in a logical OR configuration in one or more embodiments. In one or more embodiments, at least one trigger input circuit comprises an active circuit that includes a capacitor, a diode, and a comparator. The comparator can compare an input signal to a variable threshold in one embodiment. The active circuit can be configured to detect changes at an input terminal, or alternatively, to detect absolute voltage levels at the terminal as will be described below.

In one embodiment, when a trigger input circuit actuates the switch, an auto-on signal is delivered to a terminal of the control circuit. The auto-on signal alerts the control circuit that it should actuate. In addition, the auto-on circuit allows power to pass through the switch to a power input terminal of the control circuit temporarily power the control circuit. The control circuit uses power delivered from the switch to actuate an output. The output actuates a latch to continue to deliver power to the power input terminal of the control circuit. In effect, a trigger input delivers a "wake up call" to the control circuit while it also causes the switch to deliver power to a power terminal of the control circuit. The control circuit can use energy from the switch to actuate the latch to continue to deliver power to the control circuit.

In one embodiment, a portable charging device utilizes a signal due to discharge of a biased output capacitance as a trigger input that occurs when an external device is connected. The external device, which may have a capacitive or resistive path to ground, i.e., a common node, loads the output capacitance. This external loading caused by the connection between devices generates a falling edge signal, which is used as a trigger input to actuate the switch, which in one embodiment is a transistor. The trigger input causes an auto-on signal to reach the control circuit in addition to causing the switch to deliver power to the control circuit, thus turning ON the control circuit and device. The control circuit then actuates a latch to continue to deliver power to its power input terminal.

In a charging application, embodiments of the disclosure enable automatic "turn ON" of a charger when an external device is connected. This is in contrast to a user having to press a button to turn the device ON. Advantageously, a user does not have to remember this activation step. While some prior art auto-on circuits have been proposed, they are generally far more complex and expensive than are embodiments of the present disclosure. Moreover, most prior art solutions require an additional terminal at the device/external device interface to detect when the external device is connected. Embodiments of the disclosure advantageously save tens of cents compared to prior art solutions in addition to reducing the number of interface connections.

Turning now to FIG. 1, illustrated therein is one explanatory electronic device 100 configured in accordance with one or more embodiments of the disclosure. The explanatory electronic device 100 of FIG. 1 is shown as a portable charging device for illustrative purposes. However, it will be obvious to those of ordinary skill in the art having the benefit of this disclosure that other electronic devices may be substituted for the explanatory charging device of FIG. 1. For example, the electronic device 100 may be configured as a palm-top computer, a tablet computer, a gaming device, wearable computer, a media player, or other device, as any of these devices may have an application where an auto-on capability is required when the device is connected to another device. For example, two gaming devices may turn on when connected so that users could compete against each other in an electronic gaming environment.

The electronic device 100 of FIG. 1 includes an energy-sharing feature. In one or more embodiments, activation of the energy-sharing feature allows the user of the electronic device 100 to share energy stored within one or more energy storage device(s) disposed within the electronic device with one or more other device(s) via one or more power interface (s) such as shown by the connector end of the power interface 101. In one or more embodiments, the electronic device 100 includes a power interface 101 that is operable with the energy storage device 102. In this illustrative embodiment, the power interface 101 comprises a micro-USB connector 103 attached to the electronic device 100 by a flexible cable 104. In one embodiment, the power interface 101 can be used to deliver energy from the energy storage device 102 as well. For example, in one embodiment, the user can connect an external device to the power interface 101 so that energy from the energy storage device 102 can be delivered to the external device. This provides a convenient way for the user to share energy with a friend, for example, who may have a device with a depleted battery.

As shown in FIG. 1, in one or more embodiments the flexible cable 104 and the power interface 101 are stowable within the housing members 105,106 of the electronic device 100 when not in use. For example, when the user is not sharing energy with a friend's device, there may be no need for the power interface 101 to be dangling from the electronic device 100. Accordingly, in one or more embodiments the user may stow the flexible cable 104 and the power interface 101 into a power interface receiver 107. In the illustrative embodiment of FIG. 1, the flexible cable 104 emanates from the bottom 108 of the electronic device 100. The power interface receiver 107 extends from the connection point 109 along one side 110 of the bottom 108 of the electronic device 100 and up one side 111 of the electronic device 100. When the power interface 101 is inserted into the power interface receiver 107, the exterior 112 of the micro-USB connector 103 and the exterior 113 of the flexible cable 104 define an exterior sidewall of the electronic device 100 that the user can hold. When the user desires to share energy with another device, they may lift a thumb tab 114 of the micro-USB connector 103 to curl the power interface and flexible cable 104 out of the power interface receiver 107. In one or more embodiments, a length of the flexible cable 104 is greater than a length of the side 111 of the electronic device 100 to give the user more flexibility in energy-sharing, as the external device attached to the power interface 101 need not be close to the electronic device 100.

In one or more embodiments, the electronic device 100 is configured with only a single control button 115. In one embodiment, control button 115 defines a user interface capable of physical user actuation by touching or pressing, and is the only such user interface of the electronic device 100 in one embodiment. Other configurations will be obvious to those of ordinary skill in the art having the benefit of this disclosure.

Figure 2:
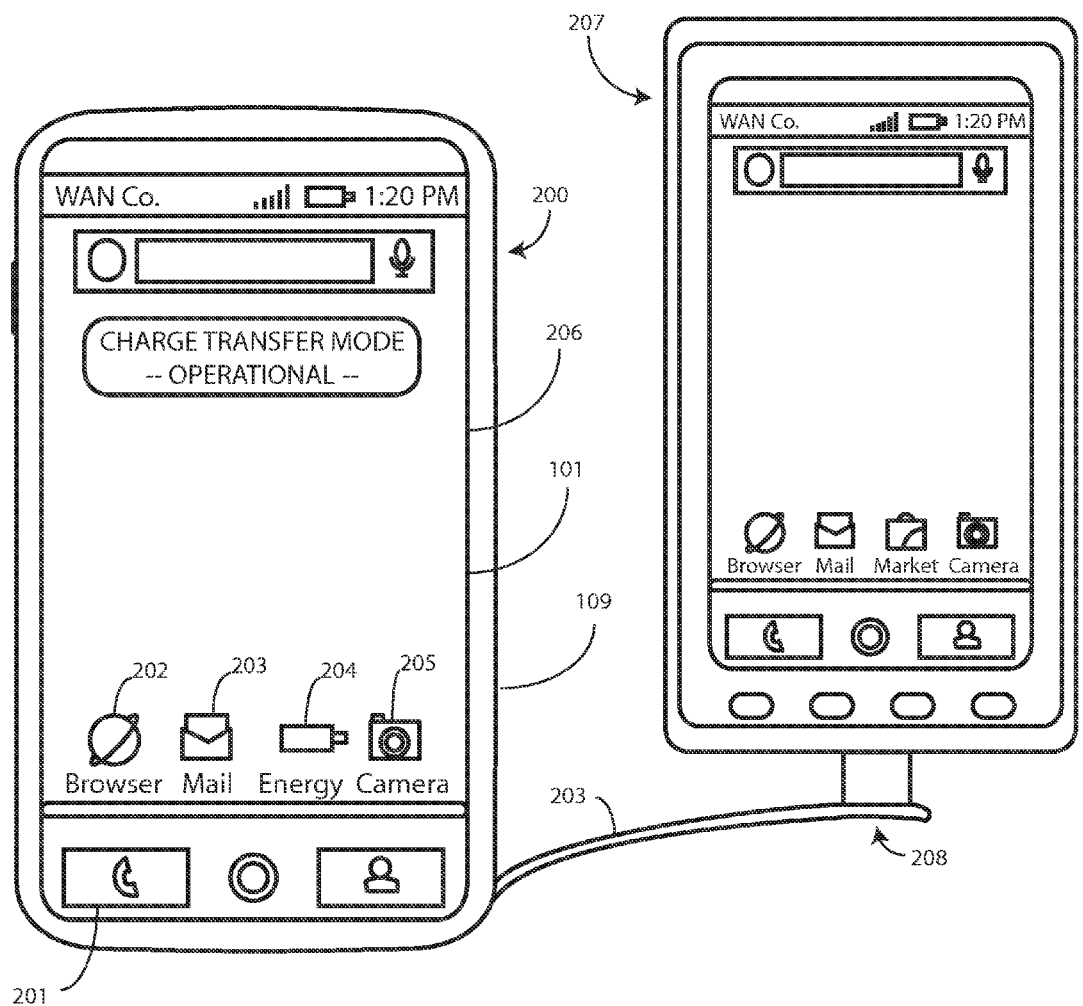
FIG. 2 illustrates an alternate device configured in accordance with one or more embodiments of the disclosure working with another device.

Note that the second major face 116 of the explanatory embodiment of FIG. 1 is generally convex in that a central portion of the second major face 116 of the electronic device 100 extends outwardly from the electronic device 100, i.e., up, to the right, and out of the page as viewed in FIG. 2, relative to the side portions of the second major face 116. While this is one configuration of the second major face 116 that is aesthetically pleasing and convenient for use by the user, it should be noted that housings of electronic devices employing embodiments of the disclosure can take a variety of shapes, and can be substantially planar, convex, concave, undulating, or combinations thereof.

In one or more embodiments, the electronic device 100 also includes an energy capacity indicator 117 that is operable with the energy storage device 102. In this illustrative embodiment, the energy capacity indicator 117 comprises a plurality of lights 118,119,120,121, each of which is configured as a light emitting diode. In one embodiment the energy capacity indicator 117 is to present a visible indication to the user that is indicative of the amount of energy stored in the energy storage device 102. The energy capacity indicator 117 may be configured to convey other information as well, such as indicating that energy sharing is occurring through the power interface 101.

Turning now to FIG. 2, illustrated therein is another electronic device 200 having energy sharing capabilities in accordance with one or more embodiments of the disclosure. To show that energy sharing functions can be added to devices other than dedicated charging devices, the explanatory electronic device 200 of FIG. 2 is shown as a smart phone for illustrative purposes.

The electronic device 200 is capable of executing an operating system to generate an operating system environment. The operating system environment, which is configured as executable code operating on one or more processors or control circuits of the electronic device 200 in one embodiment, has associated therewith various applications or "apps." Examples of such applications shown in FIG. 2 include a cellular telephone application 201 for making voice telephone calls, a web browsing application 202 configured to allow the user to view webpages on the touch-sensitive display 206 of the electronic device 200, an electronic mail application 203 configured to send and receive electronic mail, and a camera application 205 configured to capture still (and optionally video) images. These applications are illustrative only, as others will be obvious to one of ordinary skill in the art having the benefit of this disclosure.

The electronic device 200 also includes an energy-sharing application 204. In one or more embodiments, activation of the energy-sharing application 204 allows the user to share energy stored within an internal energy storage device with an external device 207 via the power interface 208. In one embodiment, the user can enter instructions and other control data into the energy-sharing application 204 to control how, if, and/or when energy is shared with other devices. For example in one embodiment, the user can enter user instructions into the energy-sharing feature to limit the amount of energy that can be shared with another device to permit the energy-sharing feature from consuming all of the energy stored in the energy storage device, which in this embodiment is a rechargeable electrochemical battery. In another embodiment, the user can enter user instructions to control the energy-sharing feature to define how much energy is to be shared with another device.

Figure 3:
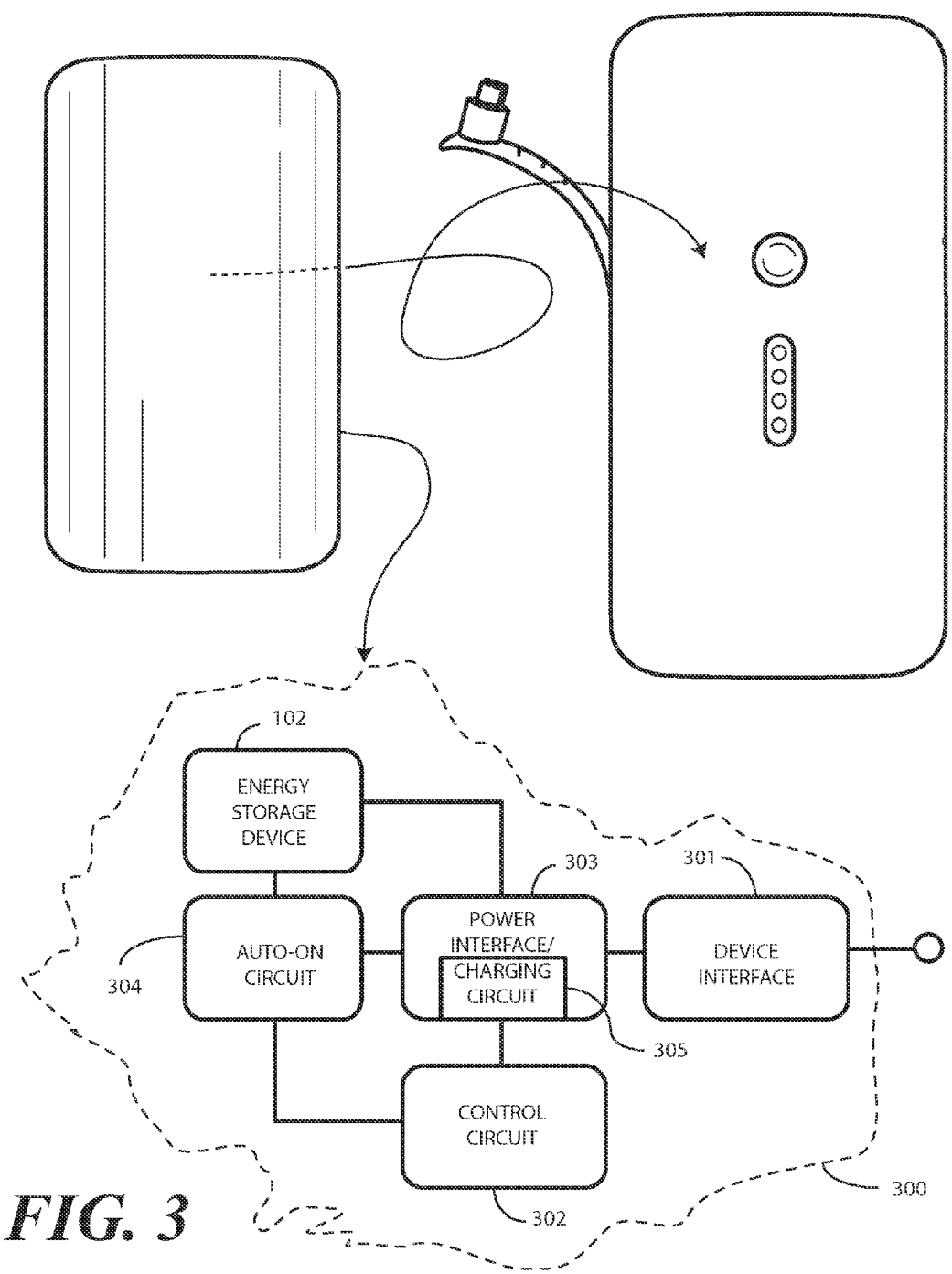
FIG. 3 illustrates one explanatory device, and schematic block diagram, each configured in accordance with one or more embodiments of the disclosure.

Turning now to FIG. 3, illustrated therein is the electronic device 100 of FIG. 1 with a block diagram schematic 300. As shown in FIG. 3, the electronic device 100 includes a device interface 301, which is in one embodiment a connector. The electronic device 100 also includes a control circuit 302, a power interface 303, charging circuit 305, and auto-on circuit 304, and an energy storage device 102.

The control circuit 302 can be responsible for performing the various functions of the electronic device 100, and can include one or more processors. For example, in one embodiment, the control circuit 302 is operable with the auto-on circuit 304 to power up the electronic device 100 when an external device is connected to the device interface 301. The control circuit 302 can be a microprocessor, a group of processing components, one or more Application Specific Integrated Circuits (ASICs), programmable logic, or other type of processing device. The control circuit 302 can be operable with other components of the electronic device 100, including the power interface 303 and charging circuit 305.

The control circuit 302 can be configured to process and execute executable software code to perform the various functions of the electronic device 100. A storage device, such as an on-board memory, stores the executable software code used by the control circuit 302 for device operation. The executable software code used by the control circuit 302 can be configured as one or more modules that are operable with the control circuit 302. Such modules can store instructions, control algorithms, and so forth. The instructions can instruct processors or control circuit 302 to perform the various steps for sharing energy from the energy storage device 102 as described herein.

In one embodiment, the energy storage device 102 is a rechargeable battery. For example, in one embodiment the energy storage device 102 can be a lithium-ion rechargeable battery. Lithium-ion cells are popular choices for use in batteries of many portable electronic devices. However, it will be clear to those of ordinary skill in the art having the benefit of this disclosure that other cell types could also be used with the energy storage device 102. For example, rather than using a lithium-ion cell, a lithium-polymer cell could be used.

In one embodiment, the energy storage device 102 comprises at least one cell having an anode, a cathode, and one or more separator layers. The anode serves as the negative electrode, while the cathode serves as the positive electrode. The separator layers prevent these two electrodes from physically contacting each other. While the separator layers physically separate the cathode from the anode, the separator layers permit ions to pass from the cathode to the anode and vice versa so the energy storage device 102 can be charged or discharged.

In one embodiment, the anode and cathode each comprise a foil layer coated with an electrochemically active material. For example, the anode can include a copper foil layer that is coated with graphite in one embodiment. The cathode can include an aluminum foil layer that is coated with Lithium Cobalt Dioxide ($LiCoO_2$). The separator layers electrically isolate the anode from the cathode, and comprise a polymer membrane in one or more embodiments.

The electrode assembly of the energy storage device 102 can be placed in an electrolyte. In one embodiment, the electrolyte is an organic electrolyte and provides an ionic conducting medium for lithium ions to move between the anode and cathode during charge and discharge of the energy storage device 102. The anode, cathode, and separator layers can be either wound in a jellyroll configuration or cut and stacked.

In one embodiment the power interface and charging circuit 305 is operable with the energy storage device 102. In one or more embodiments, the charging circuit 305 can be used to share energy stored within the energy storage device 102 with one or more other electronic device(s). Optionally, the power interface 303 and charging circuit 305 can be used to charge the energy storage device 102 as well. However, in some embodiments, the power interface 303 and charging circuit 305 will only be used to share energy with another device, and a separate charging connector (not shown) will be included for charging internal storage elements.

In one embodiment, the control circuit 302 is to actuate the charging circuit 305 so that the charging circuit 305 can deliver energy to an external device through the device interface 301, which in one embodiment is a connector. In one embodiment, the auto-on circuit 304 is configured to determine that another device is coupled to the device interface 301. When this occurs, the auto-on circuit 304 is to deliver an auto-on signal to the control circuit 302. The control circuit 302 is then, in response to receiving the auto-on signal, to actuate a latch to deliver power to a power input terminal of the control circuit 302 to keep the control circuit 302 powered. The control circuit 302 can then cause the power interface and charging circuit 305 to deliver energy through the device interface 301. This will be described in more detail with reference to FIGS. 4-8 below.

Figure 4:
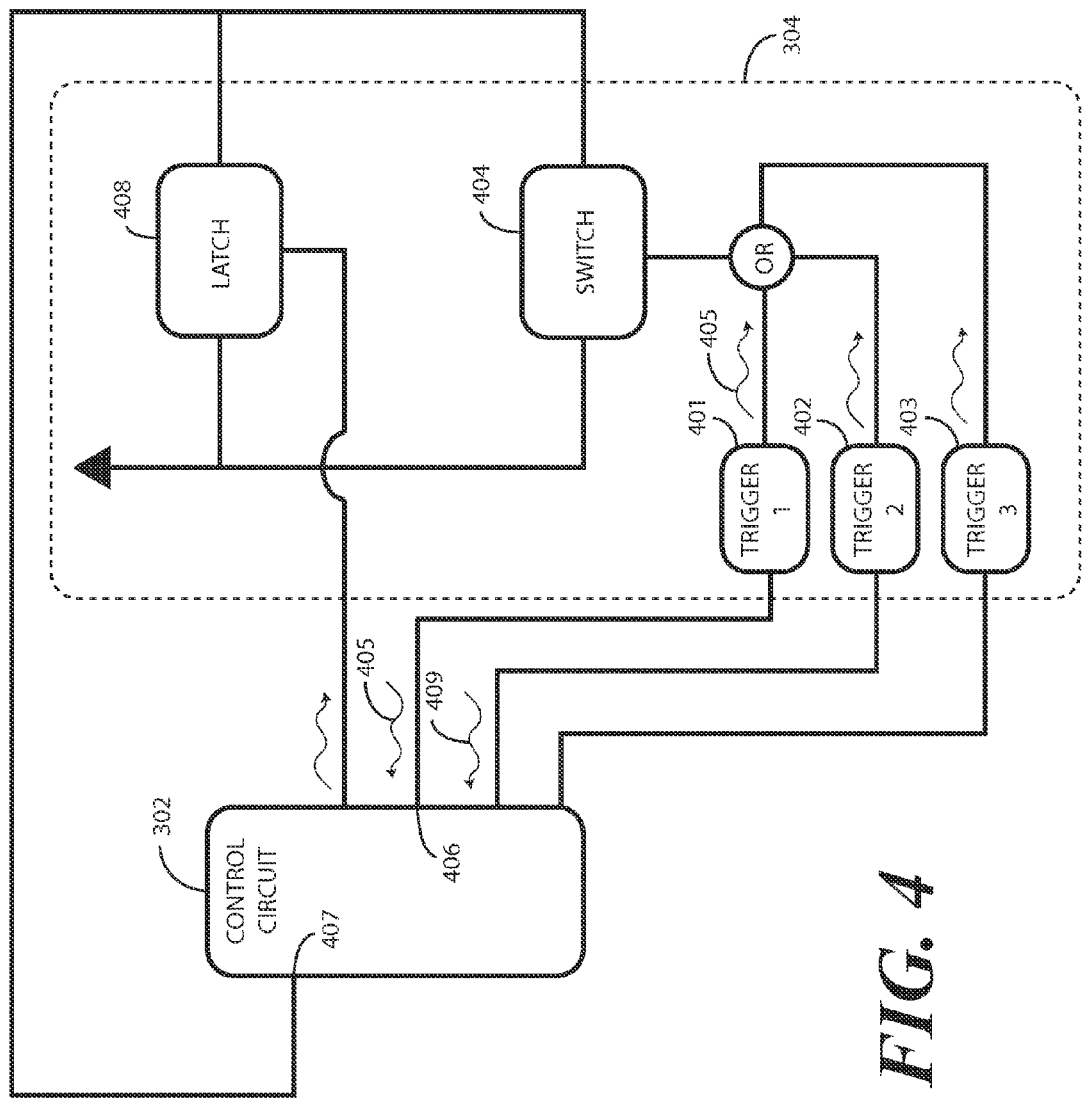
FIG. 4 illustrates one explanatory schematic block diagram for a device configured in accordance with one or more embodiments of the disclosure.

Beginning with FIG. 4, the control circuit 302 and auto-on circuit 304 are shown in a schematic block diagram. As mentioned above, in one embodiment the control circuit 302 is to cause the charging circuit (305) to deliver energy to an external device through a device interface (301) such as the power interface (208) shown in FIG. 1. In one embodiment, the auto-on circuit 304 is to activate the control circuit 302 when the external device is connected.

In this embodiment, the auto-on circuit includes a plurality of trigger input circuits 401,402,403. While three are shown for illustrative purposes, in some embodiments only one trigger input circuit will be present. In other embodiments, two, four, or more trigger input circuits will be present. These input circuits are referred to as "trigger input" circuits because they are used both actuate a switch 404 when their state changes and to deliver a control signal to the control circuit 302. Actuating the switch 404 causes power to be delivered to a power input terminal 407 of the control circuit 302 to momentarily turn the control circuit 302 ON. Delivering a control signal to the control circuit 302 indicates that the control circuit 302 should actuate a latch 408 to continue to remain powered ON. The trigger input circuits 401,402,403 thus provide both a signaling and powering function for the control circuit 302. Note that each function may be very short in some situations. Since the powering function may be short, the control circuit 302 actuates the latch 408 to remain operational in one or more embodiments.

To be effective, the trigger input circuits 401,402,403 only have to be in a state active to control the switch 404 and deliver the auto-on signal 405 for a predefined duration that is sufficiently long for the control circuit 302 to actuate the latch 408. Once the latch 408 is latched, there is no need for the trigger input circuits 401,402,403 to remain active. As will be shown below with reference to FIG. 5, in one embodiment the state of a trigger input circuit is changed due to the discharge of a capacitor tied to the output pin of a connector. So long as this change in state occurs for a period sufficient for the control circuit 302 to latch the latch 408, the auto-on circuit 304 is effective. As will be shown in FIG. 5, the time that a trigger input circuit is active can be set with a resistor-capacitor pair in one or more embodiments.

In the illustrative embodiment of FIG. 4, the trigger input circuits 401,402,403 are arranged in an "OR-ed" configuration. Accordingly, when any one of the trigger input circuits 401,402,403 changes state, the auto-on signal, e.g., auto-on signal 405, will be delivered to a signal input terminal 406 of the control circuit 302. Additionally, the switch 404 will be actuated. Said differently, activation of any one of the trigger input circuits 401,402,403 is sufficient to deliver the auto-on signal 405 even if the other trigger input circuits are not active. If two trigger input circuits, e.g., trigger input circuit 401 and trigger input circuit 402, change state simultaneously, two auto-on signals 405,409 will be delivered to the control circuit 302 and the switch 404 will be actuated as well.

When the switch 404 is actuated by one or more of the trigger input circuits 401,402 403, power is delivered to a power input terminal 407 of the control circuit 302. The control circuit 302, in response to receiving the auto-on signal 405 at the signal input terminal 406 and power at the power input terminal 407, then latches power to its power input terminal 407 by actuating the latch 408 to continue to power itself and remain operational. Once powered ON in a continuous operational mode, the control circuit 302 can cause the charging circuit (305) to deliver power to an external device.

Figure 5:
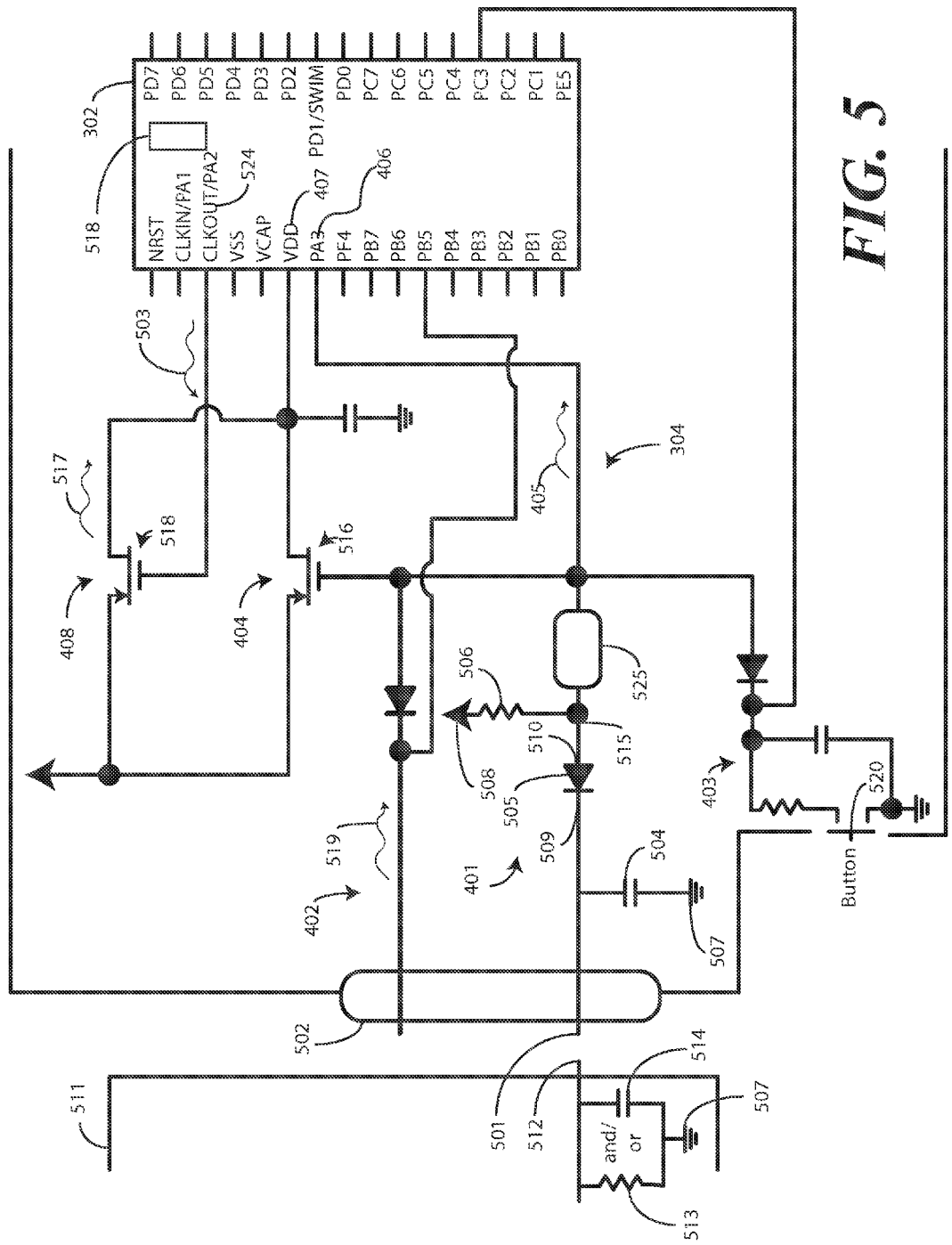
FIG. 5 illustrates one explanatory schematic block diagram for a device configured in accordance with one or more embodiments of the disclosure.

Turning now to FIG. 5, illustrated therein is a more detailed schematic diagram of one explanatory control circuit 302 and auto-on circuit 304 configured in accordance with one or more embodiments of the disclosure. In this illustrative embodiment, the control circuit 302 is an STM8S 8-bit microcontroller with on-board memory manufactured by STMicroelectronics. This is but one possible example for the control circuit, as others will be obvious to those of ordinary skill in the art having the benefit of this disclosure.

The auto-on circuit 304 of this illustrative embodiment includes three trigger input circuits 401,402,403. The auto-on circuit 304 also includes a switch 404 and a latch 408. In one embodiment, either or both of the switch 404 and the latch 408 are configured as transistors. In the illustrative embodiment of FIG. 5, both the switch 404 and the latch 408 are configured as Field Effect Transistors (FETs). Other devices, including relays, Bipolar Junction Transistors (BJTs), and the like could be used as the switch 404 and the latch 408 in other embodiments.

In this illustrative embodiment, the first trigger input circuit 401 is responsive to a resistive loading and/or a capacitive discharge at terminal 501 of a connector 502 to cause the switch 404 to deliver power to a power input terminal 407 of the control circuit 302. The first trigger input circuit 401 also causes an auto-on signal 405 to be delivered to a signal input terminal 406 of the control circuit 302. When this occurs, i.e., after receiving the auto-on signal 405, the control circuit 302 generates a control signal 503 at an output terminal 524 to actuate the latch 408 so that power continues to be delivered to its power input terminal 407 as previously described.

In one embodiment, the first trigger input circuit 401 comprises an active circuit 525. The term "active" is used to refer to a circuit that includes components that supply energy or generate their own active signals. Illustrating by example, a battery, transistor, or op-amp would be an active component because it supplies energy to a circuit. By contrast, resistors, capacitors, and inductors are all passive components because they do not supply energy. In this illustrative embodiment, the first trigger input circuit 401 includes an active circuit 525 in that it includes a comparator in one embodiment as will be shown in FIGS. 6 and 7. Note that the active circuit 525 can also include passive components, including capacitors, resistors, and diodes. In this embodiment the first trigger input circuit 401 includes not only the active circuit 525, but also the passive components shown as capacitor 504, diode 505, and resistor 506.

In one embodiment, the capacitor 504 is coupled between an output terminal 501 of the connector 502 and a common node 507, which is a ground reference in FIG. 5. The diode 505 is coupled to the capacitor 504, and the resistor 506 is coupled between a node 508 coupled to an energy storage device (102) of the electronic device. Node 508 in this illustrative embodiment is a power supply rail driven by a rechargeable battery. In one embodiment, the cathode 509 of the diode 505 is coupled to the capacitor 504, and the anode 510 of the diode is coupled to the resistor 506 and the active circuit 525. The active circuit 525 is then coupled to the switch 404 and a signal input terminal 406 of the control circuit 302.

When an external device 511 is attached to the connector 502, a terminal 512 of the external device 511 couples with a terminal 501 of the connector 502. In one or more embodiments, the terminal 512 of the external device 511 has a direct or indirect path to the common node 507. For example, the path can be a direct path through a resistor 513. Alternatively, the path can be a leakage path through a capacitor 514, inductor, or other component. Of course, combinations of the resistor 513, capacitor 514, inductor, or other components can be used as well. Note that in one or more embodiments terminal 512 may be biased to a predetermined voltage by the external device 511. However, even where this is the case, a connection event can still be detected by the active circuit 525. Diode 505 may need to be removed, however, in such applications.

When the terminal 512 of the external device 511 couples with the terminal 501 coupled to the capacitor 504, loading of the first trigger input circuit 401 occurs. This loading causes the voltage of terminal 501 to be lowered, which may include at least a partial discharge of the optional capacitor 504, which is ordinarily biased to the supply rail through the resistor 506. The drop in voltage on terminal 501 causes a node 515 at the anode 510 of the diode 505 to drop, i.e., go active low as seen by the active circuit 525. The active circuit 525 detects this and actively causes the control terminal 516 of the switch 404, e.g., the gate of a MOSFET in this embodiment, to turn the switch 404 ON, thereby delivering power from the supply rail to the power input terminal 407 of the control circuit 302. This is how trigger input circuit 401 is responsive to a resistive loading and/or capacitive discharge at the terminal 501 of the connector 502 when the external device 511 is attached thereto in this embodiment.

When the control circuit 302 receives the auto-on signal 405, the control circuit 302 is to latch power 517 to the power input terminal 407. In one embodiment, it does this by delivering a control signal 503 to the latch 408. In the illustrative embodiment of FIG. 5, the latch 408 is configured as a transistor coupled between the supply rail and the power input terminal 407. When the control signal 503 is delivered to the control terminal of the latch, e.g., the gate of a MOSFET in this embodiment, the latch 408 opens to continue to power the control circuit 302.

In one embodiment, the control circuit 302 is to cease latching power 517 to the power input terminal 407 upon detecting the occurrence of a power down event 518. The power down event 518 can take any of a variety of forms. For example, if the device is a portable charging device, and the energy storage device is becoming depleted, the control circuit 302 may detect this power down event 518 and cease charging. Afterwards, to save power, the control circuit may cease the latching by discontinuing the control signal 503.

In this embodiment, the auto-on circuit 304 includes two other trigger input circuits 402,403. In one embodiment, the second trigger input circuit 402 is responsive to an input signal 519 received from an external device. For example, if the energy storage device of the device is to be recharged, an external charging device may deliver the input signal 519 indicating that the energy storage device is to be charged. As with the resistive loading and/or capacitive discharge occurring with the first trigger input circuit 401, receipt of the input signal 519 causes an auto-on signal to be delivered to a signal input terminal of the control circuit 302. Additionally, the switch 404 will be actuated. The control circuit 302 can then latch the latch 408 as previously described to remain powered ON.

In one embodiment, the third trigger input circuit 403 is responsive to a user control actuator, which is shown as a push-button 520 in FIG. 5. When the push-button 520 is pressed, an auto-on signal will be delivered to a signal input terminal of the control circuit 302. Additionally, the switch 404 will be actuated. The control circuit 302 can then latch the latch 408 as previously described to remain powered ON.

With both the first trigger input circuit 401 and the second trigger input circuit 403, the timing of the auto-on signal can be altered by component selection. Recall from above that to be effective in one embodiment, the trigger input circuits 401,402,403 only have to be in a state active to control the switch 404 and deliver the auto-on signal 405 for a pre-defined duration that is sufficiently long for the control circuit 302 to actuate the latch 408. Once the latch 408 is latched, there is no need for the trigger input circuits 401,402,403 to remain active. In yet another embodiment, the latch 408 may be obviated by having control signal 503 coupled to the control terminal 516 of the switch 404 and operated in such a manner, e.g. active-low, diode-OR'ed, as to perform the latching function with less space and cost.

Figure 6:
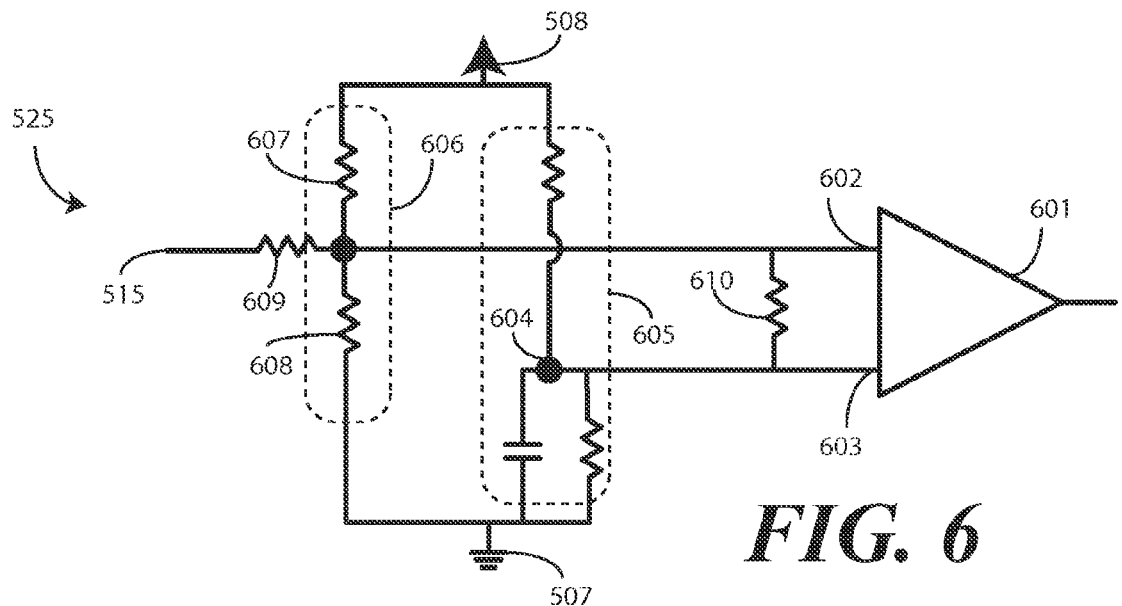
FIG. 6 illustrates one explanatory active circuit configured in accordance with one or more embodiments of the disclosure.
Figure 7:
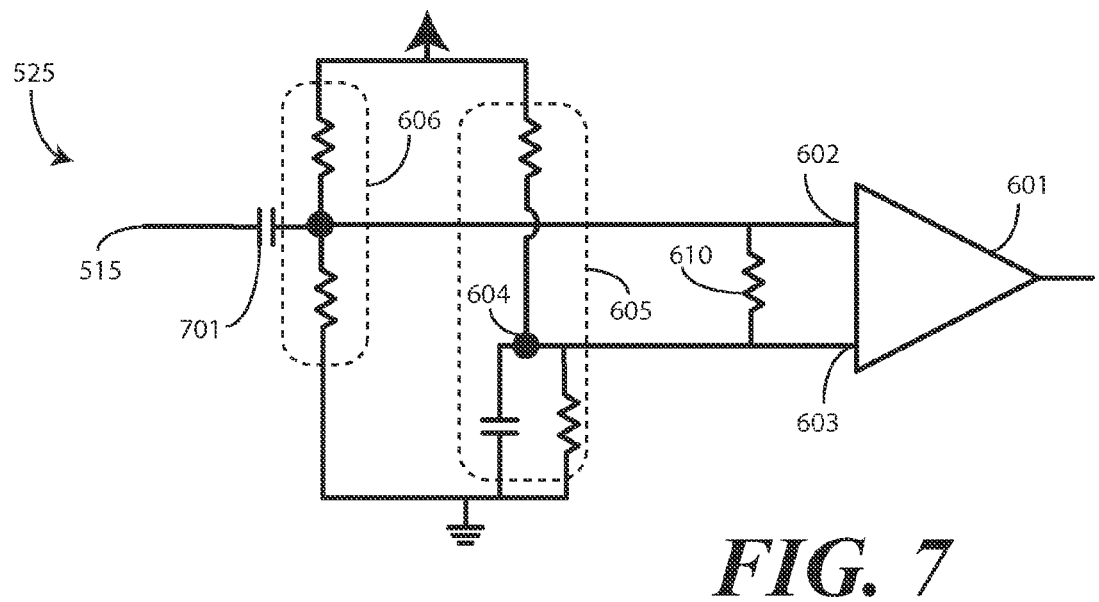
FIG. 7 illustrates another explanatory active circuit configured in accordance with one or more embodiments of the disclosure.
Figure 10:
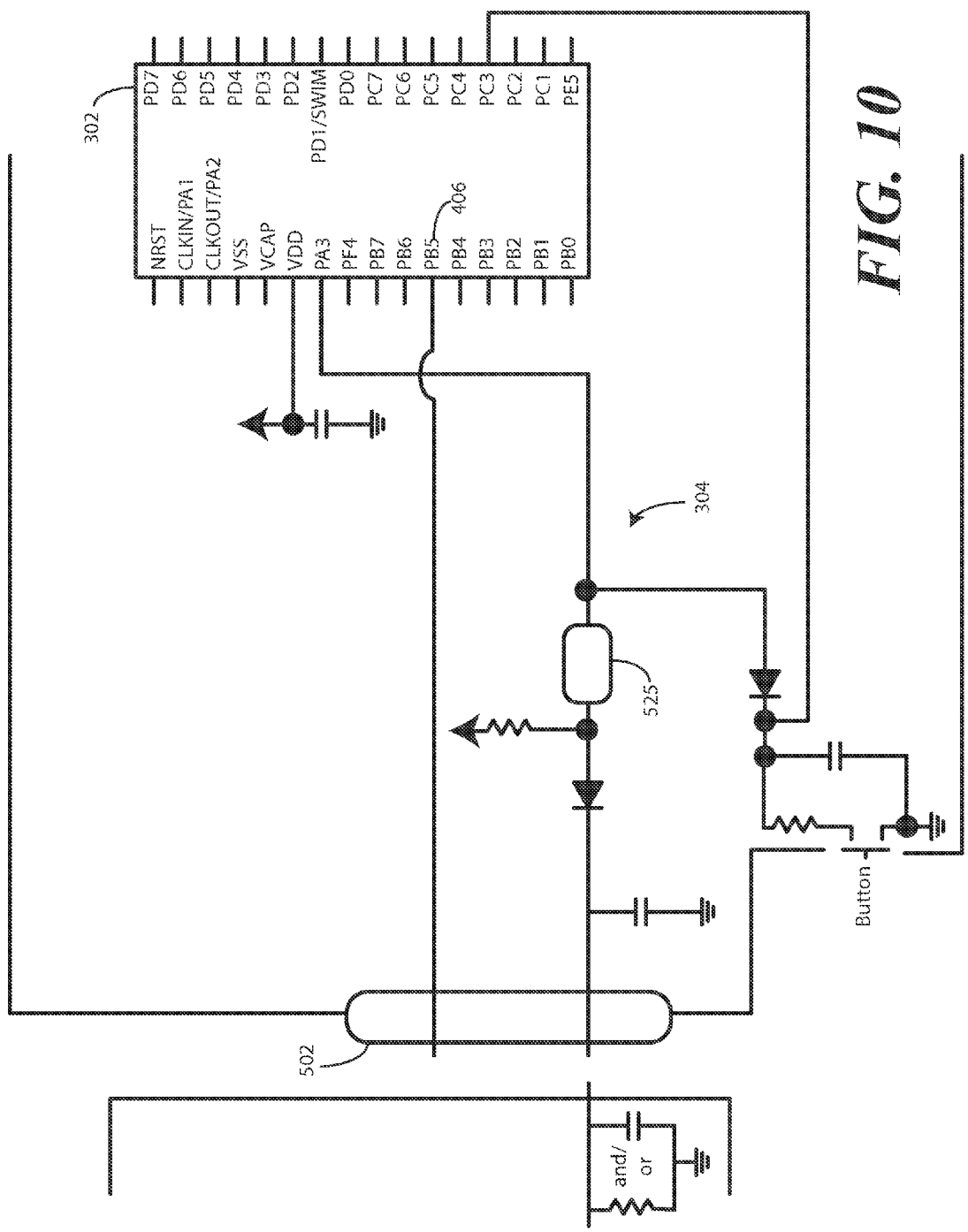
FIG. 10 illustrates another explanatory schematic block diagram for a device configured in accordance with one or more embodiments of the disclosure.

Turning briefly to FIG. 10, illustrated therein is an alternate schematic diagram of one explanatory control circuit and auto-on circuit 304 configured in accordance with one or more embodiments of the disclosure. In this illustrative embodiment of FIG. 10, the latch (408) and switch (404) of FIG. 5 are removed, and the control circuit 302 is continually powered. Output of the active circuit 525, which works as previously described, and as will be described in more detail below with reference to FIGS. 6 and 7, is delivered directly to the control circuit 302 when a connection to another device is attached to the connector 502. This allows the control circuit 302 to directly cause the delivery of power to the connector as previously described.

Turning now to FIGS. 6 and 7, illustrated therein are two different embodiments of an active circuit 525 suitable for use with the first trigger input circuit (401) of FIG. 5 and configured in accordance with one or more embodiments of the disclosure. Beginning with FIG. 6, the active circuit 525 includes a comparator 601 having two inputs 602,603. A first input 602 is coupled to node 515, which as described above is operable in conjunction with the capacitor (504), diode (505), and resistor (506) of FIG. 5 in one embodiment. The other input 603 is coupled to a voltage defined at node 604. In one embodiment, the voltage at node 604 is variable, in that it is set by a resistor divider 605 coupled between a common node 507 and the node 508 of the supply rail.

An optional scaling circuit 606 is shown. The optional scaling circuit 606 can be used to scale the voltage present at node 515. In many applications, the resistors 607,608 forming the resistor divider of the optional scaling circuit 606 will not be used, and can thus be left unpopulated. However, if an application required the capacitive discharge occurring at node 515 to be scaled, suitable resistors 607,608 could be included in the optional scaling circuit 606 to provide the necessary scaling. Similarly, a short or zero ohm resistor will be populated in place of resistor 609 in many applications. Resistor 609 is shown in FIG. 6 to provide an example of how the voltages at the inputs 602,603 of the comparator 601 can be adjusted based upon application.

As noted above, when the active circuit 525 of FIG. 6 is used with the circuit of FIG. 5 and an external device is coupled to the terminal (512) coupled to node 515 of the external device 511, capacitor (504) is coupled between the terminal (512) and the common node 507. The diode (505) of FIG. 5 is then coupled to the capacitor (504), and the comparator 601 is coupled to the diode (505) through resistance 609, the value of which may be zero ohms or more. A cathode (509) of the diode (505) is coupled to the terminal (512), an anode (510) of the diode (505) is coupled to a first input (602) of the comparator (601) through a resistance 609, the value of which may be zero ohms or more. The resistor divider 605 is coupled between the node 508 coupled to the energy storage device of the electronic device and the common node 507, with a central node 604 of the resistor divider 605 coupled to a second input 603 of the comparator 601.

When loading occurs due to an external device being coupled to the terminal (501), this loading causes a voltage drop at the terminal (501). For example, in one embodiment the voltage drop can be due to at least a partial discharge of the capacitor (504), which can be included for ripple filtering, electro-static discharge, or other purposes and is ordinarily tied to the supply rail through the resistor (506). The discharge of the capacitor 504 (or other voltage drop due to the loading) causes the first input 602 of the comparator 601 to drop below the voltage established at the central node 604 of the resistor divider 605 present at the second input 603 of the comparator 601. The active circuit 525 detects this and the comparator delivers a control signal to the control terminal (516) of the switch (404) to turn the switch (404) ON, thereby delivering power from the supply rail to the power input terminal (407) of the control circuit (302). This is how the active circuit 525 is responsive to a capacitive discharge at the terminal (501) of the connector (502) when the external device (511) is attached thereto in one embodiment.

Turning now to FIG. 7, illustrated therein is an alternate active circuit 525 suitable for use with the circuit of FIG. 5 and configured in accordance with one or more embodiments of the disclosure. The active circuit 525 of FIG. 7 includes several elements that are common with the active circuit (525) of FIG. 6, including the comparator 601, the resistor divider 605 having a central node 604 coupled to the second input 603 of the comparator 601, and the optional scaling circuit 606. Also, as with the active circuit (525) of FIG. 6, the active circuit 525 of FIG. 7 has a first input 602 is coupled to node 515, which as described above is operable in conjunction with the capacitor (504), diode (505), and resistor (506) of FIG. 5 in one embodiment.

In contrast to FIG. 6, in one embodiment the active circuit 525 of FIG. 7 includes a second capacitor 701 coupled serially between the diode (505) and the first input 602 of the comparator 601. (Note that a short circuit or zero ohm resistor could alternatively be populated in place of the second capacitor 701 to obtain the active circuit (525) of FIG. 6. Accordingly, the active circuit 525 of FIG. 7 is flexible in that the type of circuit can be determined at the manufacture phase rather than the design phase.) The use of the second capacitor 701 in series with the first input 602 of the comparator 601 causes the active circuit 525 of FIG. 7 to become a "blip detector" in that it detects positive and negative voltage changes at node 515 instead of DC voltage levels as was the case with the active circuit (525) of FIG. 6. It should be noted that both can be adapted to detect different magnitudes of change at node 515 by varying the resistors of the resistor divider 605. However, the active circuit 525 of FIG. 7 is able—through the second capacitor 701—to detect changes in voltage levels occurring at node 515. Moreover, the active circuit 525 of FIG. 7 is able to detect falling edge voltage transitions occurring at node 515 in addition to rising edge voltage transitions due to the serial inclusion of the second capacitor 701.

In one or more embodiments, the resistors of resistor divider 605 are left unpopulated. Accordingly, no voltage scaling occurs at node 604. However, where this is the case, resistor 610, disposed between input 602 and input 603 is populated to facilitate slower response to changes in input voltage at input terminal 603.

As noted above, when the active circuit 525 of FIG. 7 is used with the circuit of FIG. 5 and an external device is coupled to the terminal (512) coupled to node 515 of the external device 511, capacitor (504) is coupled between the terminal (512) and the common node 507. The diode (505) of FIG. 5 is then coupled to the capacitor (504), and the comparator 601 is coupled to the diode (505). A cathode (509) of the diode (505) is coupled to the terminal, an anode (510) of the diode (505) is coupled to a first input (602) of the comparator (601) through the serially coupled second capacitor 701. The resistor divider 605 is coupled between the node 508 coupled to the energy storage device of the electronic device and the common node 507, with a central node 604 of the resistor divider 605 coupled to a second input 603 of the comparator 601.

When loading of terminal (501), which may initially be biased, occurs due to an external device being coupled to the terminal (501), this loading causes a voltage drop at terminal (501). In one embodiment, where capacitor (504) is included, the voltage drop occurs due to at least a partial discharge of the capacitor (504), which can ordinarily tied to the supply rail through the resistor (506). The loading causes a falling voltage edge to propagate through the second capacitor 701 to the first input 602 of the comparator 601, which takes the first input 602 below the voltage established at the central node 604 of the resistor divider 605 present at the second input 603 of the comparator 601. The active circuit 525 detects this and the comparator delivers a control signal to the control terminal (516) of the switch (404) to turn the switch (404) ON, thereby delivering power from the supply rail to the power input terminal (407) of the control circuit (302). This is how the active circuit 525 is responsive to a capacitive discharge and/or resistive loading at the terminal (501) of the connector (502) when the external device (511) is attached thereto in one embodiment. The active circuit 525 can have its component values selected such that the circuit will be responsive to positive voltage changes, rather than negative voltage changes. Two such trigger circuits, one being configured to detect negative voltage changes, and the other configured to detect positive voltage changes, may be used in parallel, with their outputs OR'd as with other trigger circuits, to comprise a bi-directional auto-on trigger capability.

Figure 8:
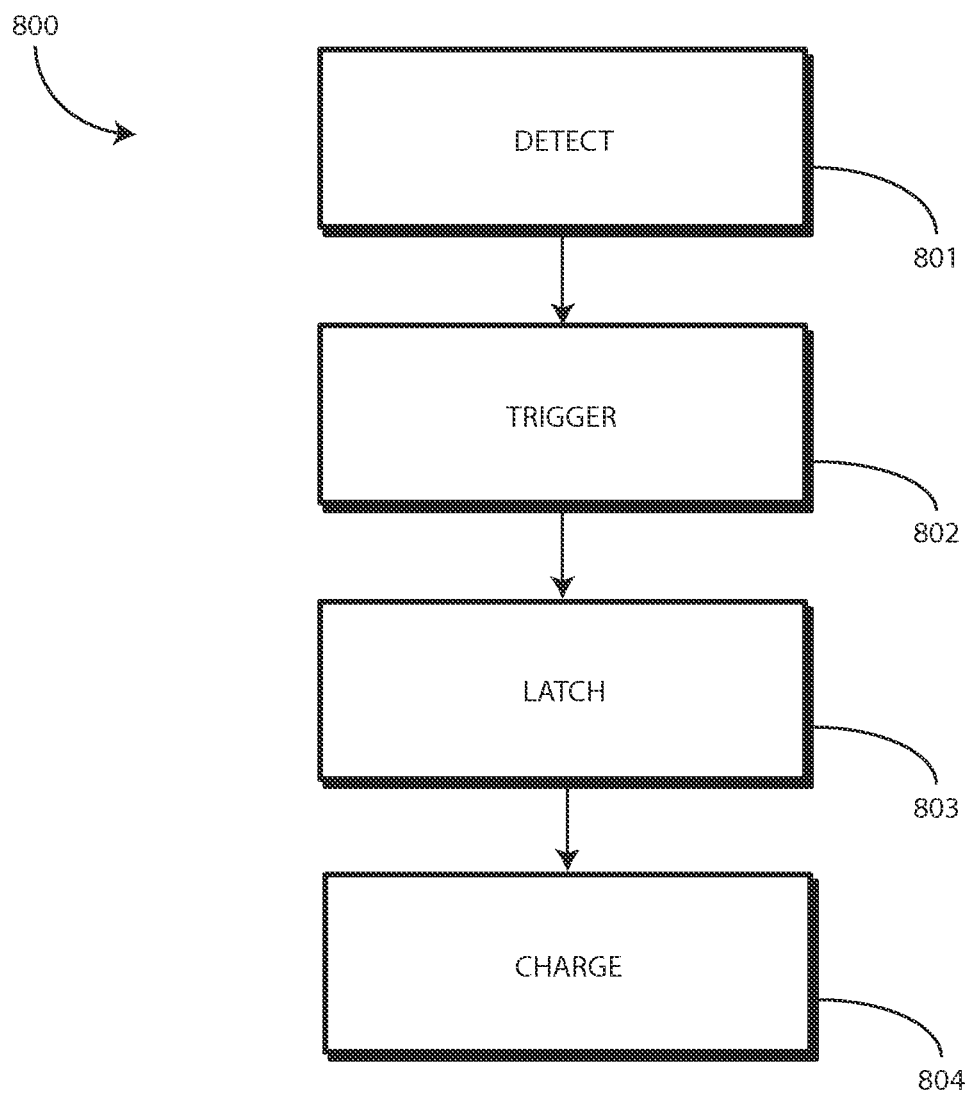
FIG. 8 illustrates one explanatory method in accordance with one or more embodiments of the disclosure.

Turning to FIG. 8, illustrated therein is a flow chart depicting a method 800 for automatically turning on a control circuit in accordance with one or more of the circuits described above. At step 801, the method 800 detects a resistive loading and/or capacitive discharge at a terminal of a device. In one embodiment, step 801 is carried out by an active circuit. In one embodiment, step 801 occurs in response to an external device being coupled to a terminal.

At step 802, the method 800 triggers a switch in response to the detecting occurring at step 801. In one embodiment, the method also delivers an auto-on signal to the control circuit at step 802. In one embodiment, the method 800 triggers the switch alternatively in response to other inputs at step 802. For example, in one embodiment step 802 includes triggering the switch and delivering the auto-on signal in response to user actuation of a user control actuator. In another embodiment, step 802 includes triggering the switch and delivering the auto-on signal in response to an input signal indicating an energy storage device is to be charged.

At step 803, the method 800 latches power to the control circuit in response to the triggering occurring at step 802. In one embodiment, the latching occurring at step 803 occurs with an output of a control circuit. At step 804, the method 800 charges an energy storage device of an external device. Alternatively, at step 804, the method can perform other functions as well including providing the energy for the external device's normal operating current. Furthermore, in cases where the external load device(s) may not have charging functionality, or may have a battery that is fully charged or is at a temperature outside of a charging range, step 804 can provide power so that the external load device can be operational. In one embodiment, step 804 occurs in response to the latching occurring at step 803.

Figure 9:
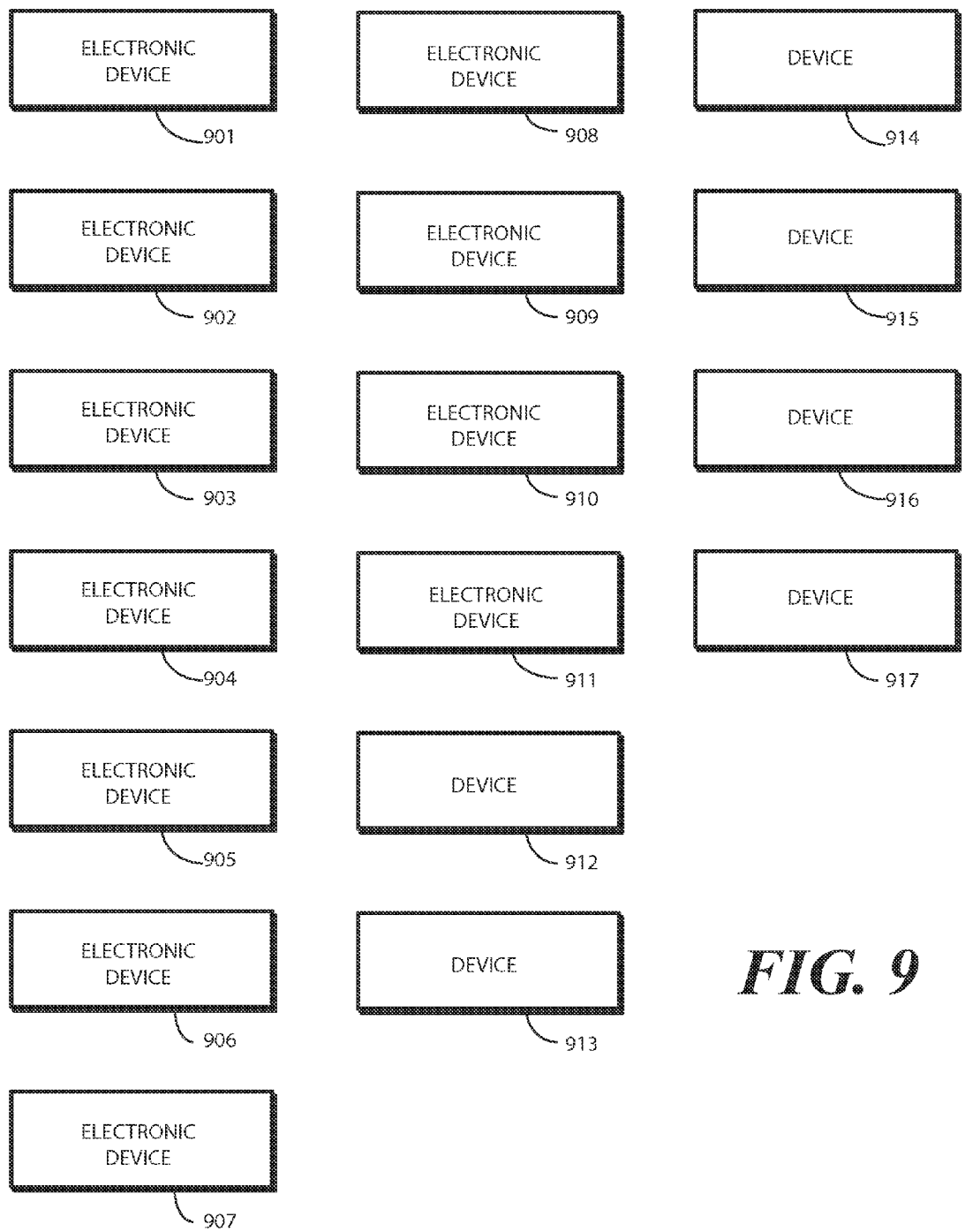
FIG. 9 illustrates various embodiments of the disclosure.

Turning now to FIG. 9, illustrated therein are various embodiments of the disclosure. At 901, an electronic device comprises a connector to connect to an external device. At 901, the electronic device can comprise a charging circuit to deliver energy through the connector. At 901, the electronic device can comprise a control circuit to actuate the charging circuit. At 901, the electronic device can comprise an auto-on circuit to actuate the control circuit.

In one embodiment, the auto-on circuit of 901 comprises a switch. In one embodiment, the auto-on circuit of 901 comprises a trigger input circuit for the switch. In one embodiment, the auto-on circuit of 901 also comprises a latch. In one embodiment, the trigger input circuit of 901 comprises an active circuit responsive to a capacitive discharge at a terminal of the connector when the external device is coupled to the connector. In one embodiment, the trigger input circuit of 901 is to deliver an auto-on signal to the control circuit and the switch. In one embodiment, the control circuit of 901 is to actuate the latch to deliver power to a power input terminal of the control circuit after receiving the auto-on signal.

At 902, the trigger input circuit of 901 comprises a capacitor coupled between the terminal and a common node. At 902, a diode is coupled to the capacitor. At 902, the trigger input circuit 901 comprises a comparator coupled to the diode.

At 903, a cathode of the diode of 902 is coupled to the terminal. At 903, an anode of the diode of 902 is coupled to a first input the comparator.

At 904, the trigger input circuit of 901 further comprises a resistor coupled between the anode and an energy storage device of the electronic device. At 905, the trigger input circuit of 901 further comprises a resistor divider coupled between the energy storage device of the electronic device and the common node, with a central node of the resistor divider coupled to a second input of the comparator.

At 906, the trigger input circuit of 901 comprises a first capacitor coupled between the terminal and a common node. At 906, the trigger input circuit of 901 comprises a diode coupled to the first capacitor. At 906, the trigger input circuit of 901 comprises a comparator. In one embodiment, at 906 the trigger input circuit of 901 comprises a second capacitor coupled serially between the diode and a first input of the comparator.

At 907, a cathode of the diode of 906 is coupled to the terminal, and an anode of the diode coupled to the second capacitor. At 908, the trigger input circuit of 901 further comprises a resistor coupled between the anode and an energy storage device of the electronic device. At 909, the trigger circuit of 901 further comprises a resistor divider coupled between the energy storage device of the electronic device and the common node, with a central node of the resistor divider coupled to a second input of the comparator.

At 910, the latch of 901 comprises a transistor coupled between an energy source and the power input terminal, the control circuit to actuate the latch by delivering the control signal to a control terminal of the transistor. At 911, the control circuit of 901 is to cease latching the power to the power input terminal upon detecting occurrence a power down event.

At 912, a device comprises a charging circuit. At 912, a device comprises a control circuit to cause the charging circuit to deliver energy to an external device. At 912, a device comprises an auto-on circuit to activate the control circuit.

At 912, the auto-on circuit comprises a plurality of trigger input circuits, arranged in an OR configuration. In one embodiment, at 912 each trigger input circuit is to actuate a switch to deliver an auto-on signal to the control circuit. At 9012 at least one trigger input circuit is responsive to an active circuit to detect the external device coupled to the charging circuit. At 912, the control circuit is to latch power to a power input terminal of the control circuit after receiving the auto-on signal. At 913, the active circuit of 912 is to detect a capacitive discharge at a terminal of a connector when the external device is attached to the connector.

At 914, the device of 912 further comprises an energy storage device. At 914, at least another trigger input circuit of 901 is responsive to an input signal indicating the energy storage device is to be charged. At 915, the device of 912 further comprises a user control actuator. At 915, the another trigger input of 914 is responsive to actuation of the user control actuator. At 916, the control actuator of 915 comprises a push button.

At 917, the trigger input circuit of 912 comprises a first capacitor coupled between a terminal and a common node. At 917, the trigger input circuit of 912 comprises a diode coupled to the first capacitor. At 917, the trigger input circuit of 912 comprises a comparator. At 912, the trigger input circuit of 912 comprises one or more of a short circuit, a resistor, or a second capacitor coupled serially between the diode and a first input of the comparator.

As described above, in one embodiment a switch provides power to a control circuit when an external device is connected to a connector. In one embodiment, this connection causes a voltage across an output capacitance to collapse, which generates a falling edge signal. The falling edge signal—via an active circuit—causes a switch to provide power to the control circuit. The control circuit then actuates a latch to keep itself powered ON. Once the latch is actuated, the control circuit can cause a charging circuit to deliver energy to the external device.

In another embodiment, at 901, an electronic device comprises a connector to connect to an external device, a power supply circuit to deliver energy through the connector, a control circuit to actuate the power supply circuit, and an auto-on circuit to actuate the control circuit. In one embodiment, at 901 the auto-on circuit comprises a switch, a trigger input circuit for the switch, and a latch. In one embodiment, at 901 the trigger input circuit comprises an active circuit responsive to detection of loading at a terminal of the connector when the external device is coupled to the connector to deliver an auto-on signal to the control circuit and the switch. At 901, in one embodiment the control circuit Can actuate the latch to deliver power to a power input terminal of the control circuit after receiving the auto-on signal.

At 902, in one embodiment the trigger input circuit of 901 can comprise a diode coupled to the terminal and a comparator coupled to the diode. At 903, in one embodiment a cathode of the diode of 902 is coupled to the terminal, and an anode of the diode coupled to a first input of the comparator. At 904, in one embodiment the device of 903 further comprises a resistor coupled between the anode and an electrical node biased by an energy storage device of the electronic device. At 905, in one embodiment, the device of 904 further comprises a resistor divider coupled between the energy storage device of the electronic device and the electrical node, with a central node of the resistor divider coupled to a second input of the comparator.

In one embodiment, at 906, the trigger input circuit of 901 comprises a first capacitor coupled between the terminal and a common node, a diode coupled to the first capacitor, a comparator, and a second capacitor coupled serially between the diode and a first input of the comparator. At 907, the cathode of the diode of 906 can be coupled to the terminal, an anode of the diode coupled to the second capacitor. At 908, the device of 907 can further comprise a resistor coupled between the anode and an electrical node biased by an energy storage device of the electronic device. At 909, the electronic device of 908 can include a resistor divider coupled between an energy storage device of the electronic device and the common node, with a central node of the resistor divider coupled to a second input of the comparator.

At 910, the latch of 901 can comprise a transistor coupled between an energy source and the power input terminal. At 910, the control circuit of 901 can actuate the latch by delivering a control signal to a control terminal of the transistor. At 911, a single transistor can act as both the switch and the latch of 901.

At 912, a device can include a power supply circuit, a control circuit to cause the power supply circuit to deliver energy to an external device, and an auto-on circuit to activate the control circuit. In one embodiment, at 912 the auto-on circuit comprises a plurality of trigger input circuits, arranged in an OR configuration, with each trigger input circuit to actuate a switch to deliver an auto-on signal to the control circuit. In one embodiment, at 912, at least one trigger input circuit is responsive to an active circuit to detect the external device coupled to the power supply circuit. At 912, the control circuit can latch power to a power input terminal of the control circuit after receiving the auto-on signal.

At 913, the active circuit of 912 can detect voltage changes at a terminal of a connector when the external device is attached to the connector. At 914, at least another trigger input circuit of 912 can be responsive to an input signal indicating the external device is to be provided with electrical power. At 915, the device of 912 can include a user control actuator, with at least another trigger input circuit responsive to actuation of the user control actuator. At 916, the user control actuator of 915 can be a push button. At 917, the auto-on circuit of 912 can include a terminal and a common node, a diode coupled to a first capacitor, a comparator, and one or more of a short circuit, a resistor, or a second capacitor coupled serially between the diode and a first input of the comparator.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device comprising:
at least one energy storage device configured to operate as a power source to power the electronic device and an external device having a first terminal;
a connector configured to connect the electronic device to the external device, the connector including a second terminal, wherein, when the external device is attached to the connector, the first terminal of the external device is coupled to the second terminal of the connector;
a charging circuit configured to deliver energy from the at least one energy storage device to the external device through the connector;
a control circuit configured to actuate the charging circuit, the control circuit including a signal input terminal and a power input terminal; and
an auto-on circuit configured to automatically detect whether or not the external device is connected to the connector, the auto-on circuit configured to actuate the control circuit when the external device is determined as connected to the connector,
wherein, upon activation of the control circuit, the charging circuit is configured to power up the electronic device and share the energy from the at least one energy storage device with the external device, the auto-on circuit including a plurality of trigger input circuits, a switch, and a latch, each of the plurality of trigger input circuits being connected to the switch and the signal input terminal of the control circuit,
wherein, when any one of the plurality of trigger input circuits transitions to an active state, the activated trigger input circuit is configured to send an auto-on signal to the signal input terminal of the control circuit, and to actuate the switch causing power to be delivered to the power input terminal of the control circuit,
wherein, in response to receiving the auto-on signal, the control circuit is configured to send to a control signal to a control terminal of the latch in order to actuate the latch,
wherein the plurality of trigger input circuits include a first trigger input circuit, and a second trigger input circuit, the first trigger input circuit configured to transition to the active state in response to a resistive loading or capacitive discharge at the second terminal of the connector, the second trigger input circuit configured to transition to the active state in response to an input signal received from the external device,
wherein the first trigger input circuit includes:
a comparator having a first input and a second input;
a first capacitor coupled between the second terminal of the connector and a common node;

a diode having an anode and a cathode;
a second capacitor coupled serially between the diode and the first input of the comparator, the cathode of the diode coupled to the second terminal of the connector, the anode of the diode coupled to the second capacitor;
a resistor coupled between the anode of the diode and an electrical node biased by the at least one energy storage device; and
a resistor divider coupled between the at least one energy storage device and the common node, a central node of the resistor divider coupled to the second input of the comparator.

2. The electronic device of claim 1, wherein the at least one energy storage device includes a lithium-ion rechargeable battery.

3. The electronic device of claim 1, further comprising:
an operating system; and
an energy-sharing application configured to execute on the operation system, the energy-sharing application configured to provide an option to limit an amount of energy that can be shared with the external device.

4. The electronic device of claim 1, wherein the electronic device is a portable charging device.

5. The electronic device of claim 1,
wherein the switch is coupled to the at least one energy storage device and the control circuit, the switch configured to switch from a first state in which the switch is open and a second state in the switch is closed when any one of the plurality of trigger input circuits transitions to the active state,
wherein the latch is coupled to the switch and the control circuit.

6. The electronic device of claim 1, wherein the plurality of trigger input circuits provide both a signaling and powering function for the control circuit.

7. The electronic device of claim 1, wherein, when the first trigger input circuit and the second trigger input circuit simultaneously change to the active state, two auto-on signals are delivered to the control circuit.

8. The electronic device of claim 1, wherein the plurality of trigger input circuits includes a third trigger input circuit, the third trigger input circuit configured to transition to the active state in response to a user control actuator,
wherein the first trigger input circuit, the second trigger input circuit, and the third trigger input circuit are coupled together in an OR configuration.

9. The electronic device of claim 1, wherein after the latch is latched, the activated trigger input circuit is configured to transition back to an inactive state.

10. The electronic device of claim 1, wherein actuation of the switch causes the power to be delivered to the power input terminal of the control circuit to power-on the control circuit for an initial period of time, and, when the control circuit receives the auto-on signal, the control circuit is configured to activate the latch to continue to keep the control circuit powered-on beyond the initial period of time.

11. The electronic device of claim 1, wherein the switch and the latch are configured as field effect transistors.

12. An electronic device, comprising:
at least one energy storage device configured to operate as a power source to power the electronic device and an external device having a first terminal;
a connector configured to connect the electronic device with the external device, the connector including a second terminal, wherein, when the external device is attached to the connector, the first terminal of the external device is coupled to the second terminal of the connector;

a charging circuit configured to deliver energy from the at least one energy storage device to the external device through the connector;

a control circuit to actuate the charging circuit, the control circuit including a signal input terminal and a power input terminal; and an auto-on circuit configured to determine whether the external device is connected to the connector, the auto-on circuit configured to actuate the control circuit when the external device is determined as connected to the connector, the auto-on circuit including a switch, a latch, and a plurality of trigger input circuits including a first trigger input circuit, and a second trigger input circuit, each of the plurality of trigger input circuits being coupled to the switch and the signal input terminal of the control circuit, the switch being coupled to the at least one energy storage device and the power input terminal of the control circuit, the latch being coupled to the control circuit and the at least one energy storage device, wherein, when any one of the plurality of trigger input circuits transitions to an active state, the activated trigger input circuit is configured to send an auto-on signal to the signal input terminal of the control circuit, and to actuate the switch causing the control circuit to receive power at the power input terminal of the control circuit, wherein the control circuit, upon detection of the auto-on signal at the signal input terminal and the power at the power input terminal, is configured to send a control signal to a control terminal of the latch in order to actuate the latch to continue to deliver the power to the power input terminal of the control circuit causing the charging circuit to share power with the external device, the activated trigger input circuit configured to transition to an inactive state after the latch is activated, the first trigger input circuit configured to transition to the active state in response to a resistive loading or capacitive discharge at the second terminal of the connector, the second trigger input circuit configured to transition to the active state in response to an input signal received from the external device, wherein the first trigger input circuit includes:
a comparator having a first input and a second input;
a first capacitor coupled between the second terminal of the connector and a common node;
a diode having an anode and a cathode;
a second capacitor coupled serially between the diode and the first input of the comparator, the cathode of the diode coupled to the second terminal of the connector, the anode of the diode coupled to the second capacitor;
a resistor coupled between the anode of the diode and an electrical node biased by the at least one energy storage device; and
a resistor divider coupled between the at least one energy storage device and the common node, a central node of the resistor divider coupled to the second input of the comparator.

13. The electronic device of claim 12, wherein the connector includes a flexible cable having a micro-universal serial bus (micro-USB) connector.

14. The electronic device of claim 12, wherein the plurality of trigger input circuits include a third trigger input circuit configured to transition to the active state in response to a user control actuator,
wherein the first trigger input circuit, the second trigger input circuit, and the third trigger input circuit are coupled together in an OR configuration such that when any one of the first trigger input circuit, the second trigger input circuit, and the third trigger input circuit transitions to the active state, both the auto-on signal is delivered to the control circuit and the switch is actuated.

15. The electronic device of claim 14, wherein, when the latch is actuated, at least one of the first trigger input circuit, the second trigger input circuit, and the third trigger input circuit transitions back to an inactive state.

* * * * *